Oct. 28, 1941. H. E. ROWE 2,260,840
TEMPERATURE CONTROL SYSTEM
Filed Aug. 19, 1939
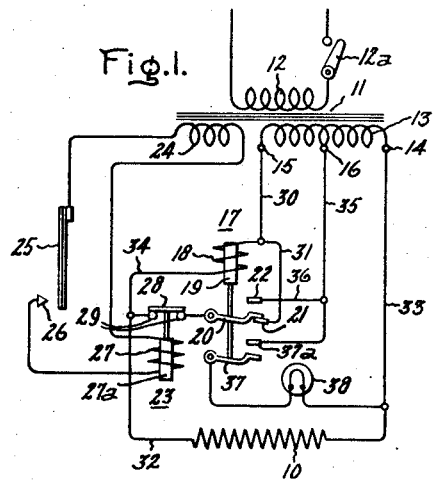
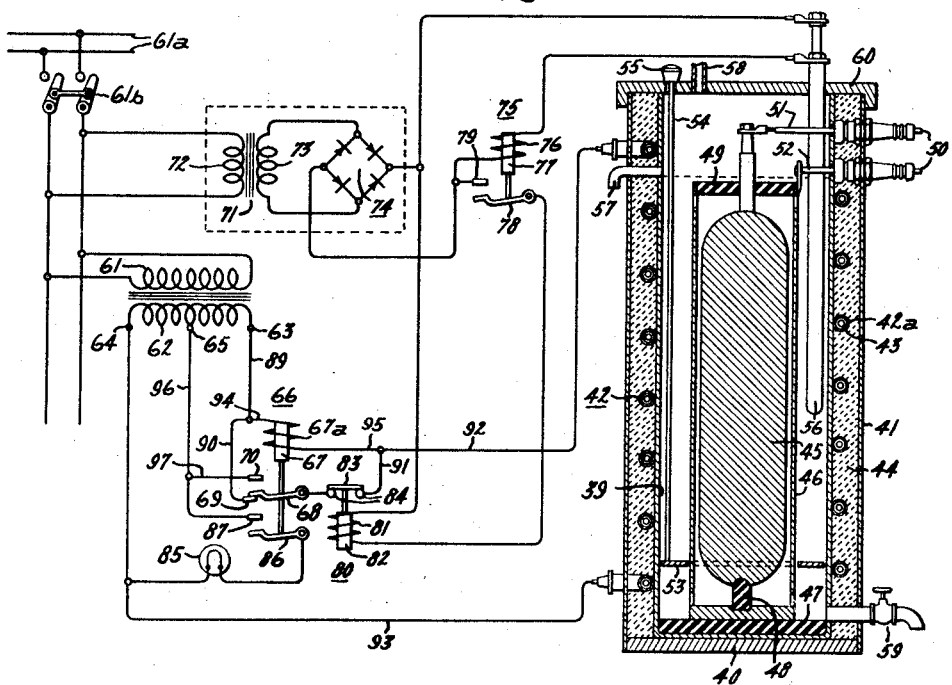
Inventor:
Hobart E. Rowe,
by Harry E. Dunham
His Attorney.

Patented Oct. 28, 1941

2,260,840

UNITED STATES PATENT OFFICE 2,260,840

TEMPERATURE CONTROL SYSTEM

Hobart E. Rowe, Pittsfield, Mass., assignor to General Electric Company, a corporation of New York Application August 19, 1939, Serial No. 291,031

2 Claims. (Cl. 219—20)

My invention relates to a temperature control system and more particularly to a temperature control system for use with ovens, temperature baths, etc. where quick heating is desirable and the maintenance of a substantially constant temperature is important.

In the usual heating system having a heater controlled by a suitable temperature responsive device, a large heater is usually provided to quickly raise the temperature to a predetermined point. In such systems, once the temperature reaches the predetermined point, the control device begins to turn the heater on and off intermittently to maintain the predetermined temperature. However, due to the storage of heat in the heater and the surrounding parts at the end of each on period, an objectionable temperature overshoot occurs. In systems where accurate temperature control is essential, for example, in temperature baths and ovens used for test purposes, overshooting is undesirable and in some cases makes the equipment unreliable or ineffective.

It is an object of my invention to provide an improved control arrangement for such heating systems which will permit the heater element to operate at an initially high heat output so as to quickly raise the temperature of the medium being heated to a predetermined point and thereafter reduce the output of the heater so that it is in effect a small heater which supplies only slightly more than the heat losses from the system.

It is a further object of my invention to provide a control system which permits the application of a large amount of power to a heating system during a heating up period and automatically provides a transition from this large amount of power to a smaller amount of power required to maintain the temperature of the system.

It is a further object of my invention to provide a control system which automatically and accurately maintains any given temperature with a minimum amount of overshoot and temperature drift in heating systems having a high thermal storage capacity.

A more specific object of my invention is to provide an improved control system for electric ovens and temperature baths having high thermal inertia so that the medium being heated may be rapidly brought to a predetermined temperature and thereafter accurately maintained at said predetermined temperature.

Further objects and advantages of my invention will more fully appear as the following detailed description proceeds and the features of novelty which characterize my invention will be particularly set forth in the claims appended to and forming a part of this specification.

For a more complete understanding of my invention, reference should be had to the accompanying drawing in which Fig. 1 is a diagrammatic view of my improved temperature control system and Fig. 2 is a view of a modified form of my improved temperature control system applied to a test cell for measuring the conductivity of liquids at a predetermined temperature.

Referring to Fig. 1, 10 represents the electric heating element of the heating system in which my improved control arrangement is applied. It is to be understood that the heating element 10 may constitute one or more heating units arranged in series or parallel relation and suitably located within the medium which is to be heated and the temperature of which is to be controlled within predetermined definite and close limits.

Arranged for supplying power to the heater element 10 is a multi-voltage supply source illustrated as a transformer 11 having a primary winding 12 connected to a suitable source of power (not shown) through the line or control switch 12a and a secondary winding 13 having terminal connections 14 and 15 and an intermediate electrical connection 16 the terminal 14 constituting a common connection and the terminals 15 and 16 constituting high and low voltage connections respectively. In accordance with my invention, the power supplied to the heater element 10 is controlled so that a large amount of power will be available for energizing the heater during the initial warming up of the medium which is being heated and at the end of the warming up period a reduced amount of power will be available for supplying sufficient heat to maintain the predetermined temperature. In order to provide for this variation in power supply to the heater element 10, I have provided automatic voltage regulating means which control the voltage impressed on the heater unit 10. The voltage regulating means comprises a relay 17 having an operating coil 18 and a plunger 19 to which is connected an armature 20 which is adapted to engage one or the other of the contacts 21 and 22 and act as a two position voltage transfer switch. When the relay 17 is in its deenergized position, the armature 20 is in engagement with the contact 21 and when the relay 17 is energized, the armature 20 is in engagement with the contact 22. The variable voltages which are impressed upon the heater 10 are obtained from the secondary winding of the transformer 11, the voltage regulating means being arranged so as to impress the voltage existing between the terminal connections 14 and 15 of the secondary winding on the heater 10 during the initial heating up period and subsequently, in response to a predetermined temperature condition, causing the voltage between the terminal connection 14 and the intermediate electrical connection 16 to be impressed on the heater 10. When the relay 17 is deenergized, the high voltage is impressed on the heater 10 and when the relay 17 is energized, the lower voltage is impressed on the heater 10.

In order to control the operation of the voltage changing means in response to the temperature of the medium being heated and to thereby effect a variation in the heat output of the heater 10 in response to temperature changes, I have provided a thermal relay circuit which comprises the relay 23 which is energized by an independent source of power obtained by means of a low voltage secondary winding 24 provided in the transformer 11. The relay 23 is energized in response to the condition of a suitable temperature control device which is schematically indicated in Fig. 1 as a suitable bimetallic element 25 which is arranged to control a suitable contact mechanism 26. When the temperature of the medium being heated by the heater 10 is below a preselected predetermined temperature, the contact 26 will be open and the relay 23 deenergized. When the temperature of the medium attains the predetermined value, however, the contact 26 is closed and the relay 23 is energized. The relay 23 comprises a coil 27 and a plunger 27a which is connected to a contactor or power switch 28 adapted to bridge a pair of contacts 29. As long as the coil 27 is deenergized, the contactor 28 bridges the contacts 29 but, when the coil 27 is energized, the contactor 28 is moved away from the contacts 29 and the circuit in which the contacts 29 are located is opened.

Considering the operation of my improved control circuit as described thus far, it will be assumed that the heater 10 is deenergized and the medium which is being heated is in the cold condition. Under these conditions, power is applied to the primary 12 of the transformer by closing switch 12a. Since the medium is in the cold condition, the contacts 26 will be open and the relay 23 will be deenergized causing the contactor 28 to bridge contacts 29. In response to this operation, the full voltage existing between the terminal connections 14 and 15 of the secondary winding 13 is applied to the heater 10 through the following circuit: terminal connection 15, lead 30, lead 31, contact 21, arm 20, across the contacts 29 by means of the contactor 28, lead 32, heater 10, lead 33, terminal connection 14, secondary winding 13 and back to terminal connection 15. With a high voltage applied to the heater 10, the medium being heated will be quickly raised to the predetermined desired temperature.

When this desired temperature is obtained, the bimetallic element of the temperature control device will be moved so as to close the contacts 26. This causes energization of the winding 27 of the relay 23 and causes the contactor 28 to be moved out of bridging relation with the contacts 29. It will be noted that the operating coil or winding 18 of the relay 17 is connected between the high voltage connection 15 and the heater terminal connection leading to the power switch 28 and the contacts of relay 17. With the power switch 28 open circuited, the full voltage of the secondary winding 13 is impressed on the winding 18 of the relay 17 through the following circuit: terminal connection 15, lead 30, winding 18, lead 34, lead 32, heater 10, lead 33, terminal connection 14, secondary winding 13, back to terminal connection 15. With the winding 18 of the relay 17 energized, the relay is picked up causing the armature 20 to be moved off the contact 21 and into engagement with the contact 22. Since the impedance of the relay 17 is high with respect to the resistance of the heater unit 10, the heat output of the heater 10 is negligible even though the energizing circuit for the coil 18 is made through this heater. With the armature 20 in engagement with the contact 22, the voltage regulating means is now in condition to supply a reduced voltage to the heater 10 when the temperature responsive device 25 calls for heat. Thus, when the temperature of the medium decreases a slight amount below the predetermined temperature, the temperature responsive device 25 causes the contact 26 to be opened thereby deenergizing the relay 23 which causes the contactor 28 to bridge the contacts 29. When this occurs, the voltage between the terminal connection 14 and the intermediate electrical connection 16 is applied to the heater 10, the circuit being as follows: from the connection 16 through the lead 35, lead 36, contact 22, arm 20, bridging connector 28, lead 32, heater 10, lead 33, terminal connection 14. At the same time, a holding circuit is provided for the relay 17, this holding circuit being arranged to impress the voltage existing between the terminal connection 15 and the intermediate electrical connection 16 on the relay 17 by means of the following circuit: terminal connection 16, lead 35, lead 36, contact 22, armature 20, connector 28, lead 34, coil 18, lead 30, terminal connection 15. The relay 17 is so designed that it will be picked up when the voltage existing between the terminal connections 14 and 15 is applied to the coil 18 thereof and it will be held closed when the voltage existing between the terminal connection 15 and the intermediate electrical connection 16 is impressed on the coil 18.

When the medium being controlled again reaches its predetermined desired temperature, the contact 26 is closed and the relay 23 is energized thereby opening the contacts 29. This substantially deenergizes the heater 10 and returns it to the circuit previously described, that is, full voltage being applied to the relay coil 18 and only a negligible amount of energy being dissipated in the heater 10.

From the foregoing, it will be observed that by my improved control system I have provided automatic voltage regulating means which are actuated in response to a temperature condition for conditioning the electric heater so that it will operate at an initial high output level during a heating up period and thereafter will operate at a materially reduced output level. It is apparent since the energy output of the heater 10 depends upon the square of the voltage impressed on the heater that if the voltage between the terminal connections 14 and 15 were twice that between the terminal connection 14 and the connection 16 then four times the energy would be available for heating up as is available during the normal operating condition. In the preferred form of my invention, the voltage between the terminal connection 14 and the connection 16 is adjusted so that the energy output of the heater

10 is sufficient to supply slightly more than the losses from the medium being controlled after it has been initially raised to the predetermined desired temperature. In providing such a reduced amount of energy, temperature overshoot is substantially eliminated and the tendency of the temperature of the device being controlled to drift is also substantially eliminated.

While I have shown a multi-voltage source of supply obtained through a transformer having an intermediate electrical connection, it is to be understood that my invention is not limited thereto since an auto transformer might be employed to supply the different voltages or my control system may be used with a conventional multi-voltage power source such as a 110/220 volt system.

In order to provide means for indicating when the relay 18 has been actuated, a second armature 37 is adapted to engage a contact 37a when the relay 17 is picked up. The armature 37 is arranged to control the energizing circuit for a suitable lamp 38.

In Fig. 2, I have shown a modified form of my improved control system for controlling the electric heating unit for a standard test cell used for testing the conductivity of a liquid. As shown in the figure, the test cell comprises a substantially cylindrical inner casing or wall 39 which is mounted on a base member 40 and is surrounded by a cylindrical outer wall 41. Provided in the space between the inner wall 39 and the outer wall 41 is a suitable heating unit 42 which is adapted to be wrapped around the outside surface of the inner wall so as to be in good heat transfer relation therewith. In the preferred form of my invention the heater unit is of the sheath type described and claimed in the United States Letters Patent 1,367,341, granted February 1, 1921, on an application filed by Charles C. Abbott. Briefly, this heater unit comprises an outer sheath 42a in which is centrally arranged a conducting helix 43 which is embedded in a tightly compacted mass of heat refractory insulating material such as magnesium oxide. Also provided between the inner wall 39 and the outer wall 41 is a mass 44 of suitable insulating material, such as rock wool.

Arranged centrally of the test cell are two test electrodes 45 and 46. The test electrode 46 is insulated from the wall 39 by means of the layer of insulating material 47 and the electrode 45 is insulated from the electrode 46 by means of the supporting insulating block 48 and insulating block 49. It will be observed that the test electrode 45 is of substantial size and in the actual test cell weighs approximately ten pounds thereby substantially contributing to the thermal inertia of the cell.

Mounted in the side wall of the test cell is a pair of high tension electrodes 50 which are provided for supplying a high voltage to the test electrodes 45 and 46. These high tension electrodes are connected to the test electrodes 45 and 46 by means of suitable leads 51 and 52 respectively. It will be understood that the high tension electrodes are connected to a suitable circuit (not shown) for supplying a suitably high voltage for testing the conductivity of any particular liquid at a particular temperature.

In order to prevent stratification of the liquid being tested, a suitable stirrer is provided in the test cell. This stirrer comprises a ring 53 of suitable material which is adapted to extend around the outer electrode 46. This ring is connected by means of a shaft 54 to a handle 55 which extends outside the cell. Movement of the ring up and down causes the liquid to be thoroughly mixed within the cell.

Provided within the cell is a temperature control device indicated generally by the numeral 56. This control device may be any suitable temperature responsive device and in the preferred form of my invention is a sensitive mercury contact type of control device comprising a capillary tube having mercury therein which is adapted to expand to make contact with a suitable electrode upon increase in temperature. While this type of control device is preferred, it is to be understood that my control system is not limited thereto since a bimetallic control device or any other suitable sensitive control may be employed.

In order to maintain the liquid within the test cell at a definite level which is just sufficient to cover the top of the electrode 46, a suitable overflow pipe 57 is provided which is adapted to extend through the inner and outer walls of the test cell. Provided in the bottom of the test cell is a suitable drain 59 for draining the fluid after it has been tested and provided in the top of the cell is a suitable inlet 58 for supplying fluid to the cell. A suitable cover 60 is provided for covering the top of the test cell.

With a test cell of the type just described, it, of course, would be possible to control the temperature of the cell by intermittently connecting the heater element to a source of power during the entire test period. However, one of the characteristics of the test cell is that it has a relatively high thermal inertia due to the mass of the test electrodes and also due to the mass of the inner wall of the test cell itself. Therefore, if full power were intermittenty applied to the heater element 42, considerable temperature overshoot would result and, in addition, the temperature of the test cell would tend to drift. Both of these results are undesirable and lead to unreliable test data. It is, therefore, important that the heating element of the test cell be controlled so that the temperature of the medium being tested can be rapidly raised to the predetermined desired temperature and thereafter maintained at this temperature without any substantial overshoot or temperature drift. The control circuit which is shown in Fig. 1 and described above readily lends itself to obtain such control. For the purposes of illustration, however, I have shown in Fig. 2 a slightly modified form of control circuit for controlling the heater element of the test cell. This modified form of control circuit is substantially the same as the control circuit shown in Fig. 1 except that a low voltage direct current supply source is provided for energizing the temperature control circuit employed for controlling the voltage regulating means.

Referring more specifically to the control circuit illustrated in Fig. 2, it will be observed that I have provided a source of power for the heater unit 42 which comprises a two winding transformer having a primary winding 61 connected to a suitable source of power (not shown) through supply leads 61a and switch 61b and a secondary winding 62 having terminal connections 63 and 64 and an intermediate electrical connection 65. While a two winding transformer having an intermediate electrical connection is illustrated, it is to be understood that my invention is not limited to such a source of supply since this transformer may be replaced by a suitable auto transformer arranged to supply the necessary voltages to the heater unit 42 in accordance with my invention.

Connected in the circuit of the secondary winding 62 I have provided a voltage controlling means similar to the voltage controlling means shown in Fig. 1 and comprising a relay 66 having a plunger 67 to which is connected an armature 68 adapted to move between the contacts 69 and 70. When the relay 66 is deenergized, the armature 68 is in engagement with the contact 69 and the heater circuit is conditioned so that the full voltage of the secondary winding 62 will be impressed across the heater 42. When the relay 66 is energized, the armature 68 is in engagement with contact 70 and the heater circuit is conditioned so that the reduced voltage existing between the terminal connection 64 and the intermediate electrical connection 65 will be impressed across the heater.

In order to control the operation of the voltage controlling means in response to the temperature of the liquid being tested, I have provided a multi-stage direct-current relay system. It is in this respect that the control arrangement shown in Fig. 2 differs from the arrangement shown in Fig. 1. The multi-stage direct-current relay system is used since it will operate on a small amount of power which produces more desirable operating conditions for the comparatively sensitive temperature control device 56. The relay circuit receives its power from a transformer 71 having a primary winding 72, connected to a source of power (not shown) through supply lead 61a and switch 61b and a secondary winding 73 the terminal ends of which are connected to a suitable copper oxide rectifier 74 for supplying direct current to the relay circuit.

Arranged in the relay circuit is a relay 75 having a winding 76, a plunger 77 and an armature 78 which is adapted to engage the contact 79. The winding 76 is energized by direct current supplied by the copper oxide rectifier 74. Arranged in circuit with the winding 76 is the temperature control device 56 and the relay 75 is arranged so that so long as the contacts of the temperature control device 56 are closed, the relay coil 76 will be energized and the armature 78 will be held in contact with the contact 79. However, when the contacts of the temperature control device 56 are open, the relay 75 is deenergized causing the armature 78 to drop away from the contact 79.

Provided adjacent the voltage controlling means 66 and energized from the same direct-current source as the relay 75 is a relay 80 having a winding 81 and a plunger 82 which is connected to a contactor 83 adapted to bridge a pair of contacts 84. The winding 81 is so arranged that when the armature 78 of the relay 75 engages the contact 79, it will be energized by direct current from the copper oxide rectifier 74. The energization of the winding 81 causes the plunger 82 to be picked up to move the contactor 83 out of engagement with the pair of contacts 84.

As described in connection with the arrangement illustrated in Fig. 1, I have provided in the arrangement shown in Fig. 2 suitable means for giving visual indication as to when the relay 66 has been energized. The means comprises an electric lamp 85 which is energized in accordance with the movement of the relay 66, the relay 66 being provided with an armature 86 which is adapted to engage the contacts 87 to close the energizing circuit for the lamp and subject the lamp to the voltage existing between the terminal connection 64 and the intermediate electrical connection 65 of the secondary winding.

Considering the operation of the arrangement described in Fig. 2, the cell is first filled to a point above the inner test electrode 45, the "full" line being indicated by the dotted line shown in the figure. In a particular application of my improved control device, a test cell is used for testing the conductivity of an insulating liquid but it is to be understood that any liquid may be used in the test cell. Since the liquid poured into the test cell is below the temperature at which the test is to be conducted, the contacts of the temperature responsive device 56 will be open. Power is applied to the apparatus by closing the line switch 61b and with the contacts of the temperature responsive device open, the winding 76 of relay 75 is deenergized and, as previously explained, the arm 78 is away from the contact 79 thereby causing the relay 80 to be deenergized and the contactor 83 to engage the contacts 84. With the contacts 84 closed, the relay 66 is shunted and hence deenergized and the arm 68 lies in engagement with the contact 69. It will therefore be observed that full voltage existing between the terminal connections 63 and 64 of the secondary winding 62 is applied to the heater element 42 through the following circuit: terminal connection 63, lead 89, lead 90, contact 69, arm 68, contactor 83, lead 91, lead 92, heater element 42, lead 93 and terminal connection 64.

With full voltage applied to the heater element 42, the temperature of the liquid begins to rise, heat flowing from the cell wall through the liquid to the cell electrodes. By operating the stirrer 53, the transfer of heat from the cell wall to the liquid being tested is made more rapid and due to the insulation 44 very little heat escapes to the outside walls of the unit.

When the temperature of the liquid reaches the predetermined temperature at which the test is to be conducted, which in the case of the particular insulating liquid being tested is approximately 100° C., the contacts of the temperature responsive device 56 are closed thereby causing energization of the relay 75 so that the arm 78 moves into engagement with the contact 79. The energization of the relay 75 produces two results, namely, the substantial deenergization of the heater element and the operation of the voltage controlling means so as to condition the energizing circuit for the heater element so that upon subsequent calls for heat by the temperature responsive device a low voltage will be impressed across the heater element. Considering the first of these results, it will be noted that when the arm 78 moves into engagement with the contact 79 upon the energization of the relay coil 76, the coil 81 of the relay 80 is energized and the contactor 83 is moved out of engagement with the contacts 84 thereby opening the heater supply circuit. Considering the second result which occurs, it will be noted that when the contactor 83 is moved out of engagement with the contacts 84, the coil 67 of relay 66 is energized, the full voltage existing between the terminal connections 63 and 64 of the secondary winding being impressed across the coil of the relay 66 through the following circuit: terminal connection 63, lead 89, lead 94, coil 67a, lead 95, lead 92, heater element 42, lead 93 and terminal connection 64. As described in connection with the relay 17 shown in Fig. 1, the impedance of the coil of relay 66 is of such magnitude that the heat output of the heater element 42 is negligible.

When the temperature of the liquid being tested has been raised to the predetermined desired value, a suitable test voltage supplied from a suitable high voltage source (not shown) is applied to the high tension terminals 50 and the conductivity test of the liquid is carried forward.

When the temperature of the liquid decreases a slight amount below the predetermined desired temperature during the course of the test, the contacts controlled by the temperature responsive device will open, thus causing the relay 75 to be dropped out moving the arm 78 out of engagement with the contact 79. This causes deenergization of the relay 80 which permits the contactor 83 to move into engagement with the contacts 84 thus closing the energizing circuit for the heater element 42 so that the voltage between the terminal connection 64 and the intermediate electrical connection 65 is applied to the heater element through the following circuit: connection 65, lead 96, lead 97, contact 70, arm 68, connector 83, lead 91, lead 92, heater 42, lead 93, and terminal connection 64. At the same time, a holding circuit is formed for the relay 66 so that the arm 68 is held in engagement with the contact 70, the holding circuit being traced as follows: terminal connection 65, lead 96, lead 97, contact 70, arm 68, connector 83, lead 91, lead 95, coil 67a, lead 89, lead 94 and terminal connection 63. The relay 66 is designed so that it will be picked up when the full voltage existing between the terminal connections 63 and 64 of the secondary winding is impressed thereon and it will be held in by the substantially reduced voltage existing between the terminal connection 63 and the intermediate electrical connection 65. Further operation of the temperature responsive device causes the substantially reduced voltage to be applied intermittently to the heater element 42 to maintain the temperature of the liquid being tested.

From the foregoing it is seen that the cell is thus rapidly heated up to the predetermined desired temperature by supplying a lot of heat thereto and causing a large temperature gradient and rapid flow of heat to the cell. After the initial operation of the temperature control device 56, the heater is operated at substantially reduced power, as previously described, and the amount of heat supplied is just a little more than enough to supply the losses from the cell which, as previously indicated, are comparatively small. Since the amount of heat supplied to the heater on subsequent calls for heat by the temperature responsive device 54 is relatively small, overshooting of the temperature is substantially eliminated and the control circuit maintains the predetermined desired temperature within very close limits. In actual tests its was found that the temperature of the medium being tested did not vary over one degree from the predetermined desired temperature.

While I have shown particular embodiments of my invention, it will be understood, of course, that I do not wish to be limited thereto since many modifications may be made and I therefore contemplate by the appended claims to cover any such modifications as fall within the true spirit and scope of my invention.

What I claim as new and desire to secure by Letters Patent of the United States is:

1. In a heating circuit, a multi-voltage supply source comprising a common connection, a high voltage connection and a low voltage connection, a control switch for controlling said supply source, an electric heater having first and second terminals, the first heater terminal being connected to said common connection, a two position voltage transfer switch normally connecting the second heater terminal to said high voltage connection but being movable to a position in which said second heater terminal is connected to said low voltage connection, a normally closed power switch interposed in the connection between said second heater terminal and said transfer switch for controlling the energization of said heater, an operating coil for said transfer switch, said operating coil being connected between said high voltage connection and said second heater terminal whereby when said control switch is initially closed said power switch closes a shunt path disabling said operating coil so that said heater is initially connected to said high voltage connection but when said power switch is opened said operating coil is energized to actuate said transfer switch to a low voltage position so that upon a subsequent closure of said power switch said heater is connected to said low voltage connection, the operating coil being then energized by a circuit completed between said high and low voltage connections.

2. In a temperature control system for an electrically heated device, a multi-voltage supply source comprising a common connection, a high voltage connection and a low voltage connection, a control switch for controlling said supply source, an electric heater having first and second terminals, the first heater terminal being connected to said common connection, a two position voltage transfer switch normally connecting the second heater terminal to said high voltage connection but being movable to a position in which said second terminal is connected to said low voltage connection, a normally closed power switch interposed in the connection between said second heater terminal and said transfer switch for controlling the energization of said heater, means responsive to the temperature of said heater for opening said power switch when the temperature of said heater exceeds a predetermined value, an operating coil for said transfer switch, said operating coil being connected between said high voltage connection and said second heater terminal whereby when said control switch is initially closed and the temperature of said heater is below said predetermined value said power switch completes a shunt path disabling said operating coil so that said heater is connected to said high voltage connection but when said power switch opens in response to a rise in temperature of said heater above said predetermined value said operating coil is energized to actuate said transfer switch to a low voltage position so that upon a subsequent fall in temperature of said heater below said predetermined value and a resulting closure of said power switch said heater is connected to said low voltage connection, the operating coil being then energized by a circuit completed between said high and low voltage connections.

HOBART E. ROWE.